Oct. 9, 1923.
H. D. HAZELBAKER
1,470,446
TIRE INFLATING DEVICE
Filed Sept. 20, 1920
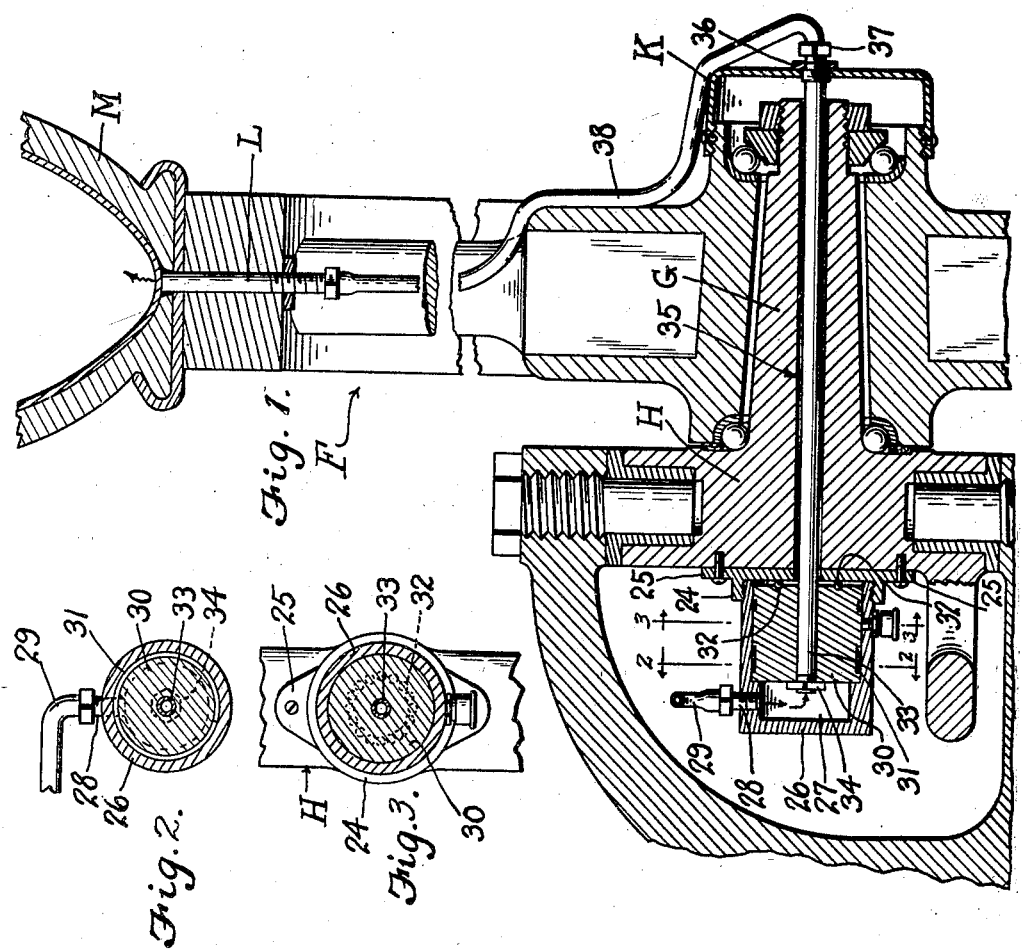
Harry D. Hazelbaker
INVENTOR
BY Victor J. Evans
ATTORNEY Patented Oct. 9, 1923.

1,470,446

UNITED STATES PATENT OFFICE.

HARRY D. HAZELBAKER, OF PORTSMOUTH, OHIO.

TIRE-INFLATING DEVICE.

Application filed September 20, 1920. Serial No. 411,527.

*To all whom it may concern:*

Be it known that I, HARRY D. HAZEL-BAKER, a citizen of the United States, residing at Portsmouth, in the county of Scioto and State of Ohio, have invented new and useful Improvements in Tire-Inflating Devices, of which the following is a specification.

This invention relates to apparatus for inflating pneumatic tires of automobiles while the vehicle is traveling and has for its object the provision of novel distributing means carried by and associated with the spindle body and associated front wheel whereby to conduct compressed air to the tire while the wheel is rotating.

An additional object is the provision of a device of this character which will be comparatively simple and inexpensive in construction and installation, efficient and positive in use, easy to operate, durable in service, and a general improvement in the art.

With the above and other objects and advantages in view, the invention consists in the details of construction to be hereinafter more fully described and claimed and illustrated in the accompanying drawings in which—

Figure 1 is a vertical section through a front wheel and the spindle body and spindle supporting it and showing my invention applied, Figure 2 is a cross section on the line 2—2 of Figure 1 and Figure 3 is a cross section on the line 3—3 of Figure 1.

Referring more particularly to the drawings I have shown a fragment of the forked end of the front axle A of a vehicle, within which fork is pivotally mounted the spindle body H from which projects the spindle G on which rotates the wheel F. The wheel is of any ordinary or preferred type and carries a tire M of the pneumatic type provided with an inflation valve L. The hub of the wheel is shown as equipped with a hub cap K secured thereon by any suitable means but in such a manner as to be air tight.

Associated with each front wheel is a distributor comprising an internally threaded collar 24 having flanges 25 secured to the spindle body H and threaded into this collar is a hollow cylindrical body 26 formed at one end with a chamber 27 into which extends a tube 28 with which is connected a flexible tube 29. The flexible tube 29 is connected with a suitable source of compressed air, such as a tank or pump. Disposed within the hollow cylindrical body 26 is a piston 30 rotatable therein and provided with packing rings 31 and ball bearings 32 are interposed between the collar 24 and the adjacent end of the piston 30 so as to reduce the friction between the piston and cylindrical body. Extending through an axial hole in the piston and secured to the piston is a tube 33 leading at one end to the chamber 27 and provided at this end with a clamping nut 34. This tube 33 extends through a bore 35 formed through the spindle body 11 and through the spindle G and also extends through the hub cap K, this second mentioned end being secured to the hub cap by clamping nuts 36 so that the tube 33 will rotate with the wheel while the cylindrical body 26 and collar 24 are rigid with respect to the spindle body. A suitable nipple 37 is secured to this outer end of the tube 33 and has connected therewith a tube 38 which is connected with the valve stem L of the tire M.

In the operation it will of course be apparent that compressed air supplied to the drum 26 through the pipe 29 will pass through the tube 33 and out through the tube 38 to the tire.

From the foregoing description and a study of the drawings it will be apparent that I have thus provided a tire inflating apparatus which is ready for use at all times and by means of which the tires may be inflated automatically even while the vehicle is traveling. An important advantage of my structure is that in case a tire develops a comparatively slow leak it may be constantly inflated so as to maintain a sufficient pressure therein to permit running of the vehicle until such time as a proper repair may be made. Another advantage of my device is that danger of running upon a partially deflated tire with the resultant disastrous effects will be entirely eliminated, my device consequently increasing the length of life of tires.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

In a tire inflating system of the character described distributing means associated with the front wheels of the vehicle comprising a hollow drum secured to the movable spindle of each front wheel and connected with a compressed air conducting pipe, a cap secured upon the hub of the associated front wheel and replacing the usual hub cap, a cylindrical member rotatable within said drum, a hollow tubular spindle secured to said cylindrical member and to said cap and rotatable through the usual front spindle supporting the wheels, and a tube connected with the outer end of said hollow spindle and connected with the valve stem of the associated tire.

In testimony whereof I affix my signature.

HARRY D. HAZELBAKER.